United States Patent [19]
Piekarski et al.

[11] Patent Number: 6,053,697
[45] Date of Patent: Apr. 25, 2000

[54] TRILOBE MOUNTING WITH ANTI-ROTATION APPARATUS FOR AN AIR DUCT IN A GAS TURBINE ROTOR

[75] Inventors: Arthur J. Piekarski, Middletown; James M. Forrester, Springboro; Charles E. Steckle; Richard F. Gutta, both of Loveland, all of Ohio

[73] Assignee: General Electric Company, Cincinnati, Ohio

[21] Appl. No.: 09/105,478

[22] Filed: Jun. 26, 1998

[51] Int. Cl.⁷ ...................................................... F01D 5/14
[52] U.S. Cl. ............................................ 415/115; 415/220
[58] Field of Search ................................... 415/220, 115, 415/116, 175, 176

[56] References Cited

U.S. PATENT DOCUMENTS

| | | | |
|---|---|---|---|
| 2,583,875 | 1/1952 | Ostmar | 416/174 |
| 2,977,142 | 3/1961 | Alford . | |
| 2,977,758 | 4/1961 | Haworth et al. | 415/122.1 |
| 3,319,929 | 5/1967 | Lawrence et al. . | |
| 3,575,528 | 4/1971 | Beam et al. | 416/39 |
| 3,647,313 | 3/1972 | Koff | 415/115 |
| 3,709,637 | 1/1973 | Petrie et al. | 415/134 |
| 3,823,553 | 7/1974 | Smith | 415/190 X |
| 3,903,690 | 9/1975 | Jones | 415/175 X |
| 4,184,797 | 1/1980 | Anderson et al. | 416/95 |
| 4,586,225 | 5/1986 | Bouiller et al. | 415/589 |
| 4,750,746 | 6/1988 | Boudot et al. | 415/230 X |
| 5,054,996 | 10/1991 | Carreno | 415/115 |
| 5,220,784 | 6/1993 | Wilcox | 416/198 A |
| 5,271,711 | 12/1993 | McGreehan et al. . | |
| 5,282,358 | 2/1994 | Schilling | 415/68 X |
| 5,332,358 | 7/1994 | Hemmelgarn et al. | 415/175 X |
| 5,472,313 | 12/1995 | Quinones et al. | 415/115 |
| 5,537,814 | 7/1996 | Nastuk et al. | 60/39.31 |
| 5,813,214 | 9/1998 | Moniz et al. | 415/175 X |
| 5,927,942 | 7/1999 | Stahl et al. | 415/115 |

*Primary Examiner*—John E. Ryznic
*Attorney, Agent, or Firm*—Andrew C. Hess; Rodney M. Young

[57] ABSTRACT

An air duct assembly for a gas turbine compressor rotor in a gas turbine engine is described. The rotor includes a compressor spool shaft and at least one stage disk, and the air duct assembly includes an elongate hollow cylindrical air duct configured to couple to a stage disk at a first end of the air duct. The second end of the air duct is configured to couple to the spool shaft. The second end of the air duct includes a plurality of lobes depending radially inward, a spool shaft insert configured to fit into an opening in the spool shaft, and a plurality of pins coupled to the spool shaft insert and configured to extend from the insert and to engage the lobes of the second end of the air duct.

20 Claims, 3 Drawing Sheets

TRILOBE MOUNTING WITH ANTI-ROTATION APPARATUS FOR AN AIR DUCT IN A GAS TURBINE ROTOR

FIELD OF THE INVENTION

This invention relates generally to gas turbine engines and more particularly, to an air duct inside a high pressure compressor rotor of a gas turbine engine.

BACKGROUND OF THE INVENTION

Many gas turbine compressor rotors contain a part known as an air duct. The air duct includes a hollow tube that is located inside the rotor and is concentric with the axis of rotor rotation. The function of the air duct is to separate air that flows along the engine centerline from the air that is in contact with the structural components of the rotor. Such separation facilitates avoiding thermal gradients in the rotor parts and matching the thermal growth of the rotor to the stationary components. The aft end of the air duct is typically fastened to the compressor rotor spool shaft with a diametrical interface fit or a screw thread. The forward end of the air duct is in a slight slip fit with a small radial clearance with the forward rotor components, usually the stage one or stage two disk.

With an interference fit at the air duct aft end, the air duct must be cooled before it can be assembled into the spool shaft. When the part temperatures normalize, there may be difficulty aligning the front of the air duct with the stage two disk. This alignment is important to keep the rotor straight thus maintaining good dynamic balance at rotor operating speed. It may also be difficult to disassemble the air duct from the rest of the rotor because of the interference fit.

If the air duct is threaded into the spool shaft, internal threads are required in the mating spool shaft. These threads may become initiation sites for cracks that can result in low part life due to the stress concentration that is inherent in screw threads. These threads may be damaged when disassembling a rotor during maintenance procedures, resulting in an unserviceable spool shaft or compressor rear shaft. Also, a threaded air duct may have problems aligning the front end with the forward rotor components.

It would be desirable to provide an air duct for a gas turbine compressor rotor in which the aft end easily couples to the compressor spool shaft and the front end of the air duct is aligned with the stage one or stage two disk. It would also be desirable to provide an air duct that for maintenance is also easy to disassemble from the rotor without damaging the spool shaft or compressor rear shaft.

SUMMARY OF THE INVENTION

These and other objects may be attained by an air duct assembly for a gas turbine rotor that provides a tight fit with the spool shaft during operation, and radial clearance between the shaft and the air duct for easy disassembly when the engine is stopped. Additionally, the air duct assembly may be configured so that the air duct will not rotate with respect to the rotor structure.

The air duct assembly includes an elongate hollow cylindrical tube or duct configured to couple at a first end to the first or second stage disk of the compressor rotor, and to couple at a second end to the spool shaft of the rotor. The assembly also includes a spool shaft insert configured to couple to the second end of the air duct and to press fit into an opening in the spool shaft. The air duct provides a radial clearance with the bore of the spool shaft insert when the engine is stopped. This radial clearance permits easy assembly and disassembly of the compressor rotor.

The second end of the air duct includes a plurality of lobes equally spaced around the circumference of the air duct end and extending axially a short distance. Particularly, the lobes are areas of the air duct wall that protrude radially into the air duct. In one embodiment the air duct includes three lobes equally spaced around the circumference of the second end of the air duct.

In operation, that is when the rotor starts rotating, the centrifugal inertia forces on the air duct are larger at the location of the lobes compared to the the forces on the thinner air duct walls between the lobes due to the larger mass of the lobes. The air duct distorts elastically to a shape that has an outward radial deflection at the lobes and an inward radial deflection between the lobes, a phenomena referred to as chording. Although the shape of the air duct is still curved, it approaches a three sided figure. The radial deflection at the lobes overcomes the radial clearance of the air duct to the spool shaft insert at a low rotor speed so that the air duct becomes centered in the bore of the spool shaft insert. This effect is present even if the shaft is 200° F. hotter than the air duct. When the engine stops, the trilobe configured end of the air duct returns to a round shape with a radial clearance between the shaft and the air duct. This clearance allows for an easy disassembly of the components at an engine overhaul without the damage that may occur with threads or an interference fit between the spool shaft and the air duct.

To prevent the air duct from rotating during engine startup, i.e., before the lobes have deflected outward far enough to overcome the radial clearance between the air duct and the spool shaft, the air duct assembly may include an anti-rotation apparatus. Particularly, a plurality of pins are coupled to and extend from the spool shaft insert. The pins are configured to engage the lobes of the air duct and therefore restrict the rotational motion of the air duct. In one embodiment, two anti-rotation pins extend from the spool shaft insert and are positioned 180 degrees apart. If the air duct is permitted to rotate during engine startup, an undesirable out of balance condition may occur which may cause undesirable vibrations in the engine.

The pins are positioned and configured so that there is a radial clearance between the pins and the thinner areas of the air duct walls located between the lobes. The pins are configured so that there is no clearance between the lobes and the pins, i.e., the pins engage the lobes, to prevent the air duct from rotating. By using two pins positioned 180 degrees apart, and having three lobes in the air duct, the air duct can only move through 7 degrees of rotation before a pin engages one of the three lobes.

The above-described air duct assembly provides for a tight fit between the air duct and the spool shaft during operation, and a radial clearance between the shaft and the air duct is provided for easy disassembly when the engine is stopped. Additionally, the air duct assembly may be configured so that the air duct will not rotate with respect to the rotor structure to prevent an out of balance condition.

DETAILED DESCRIPTION

Figure 1:
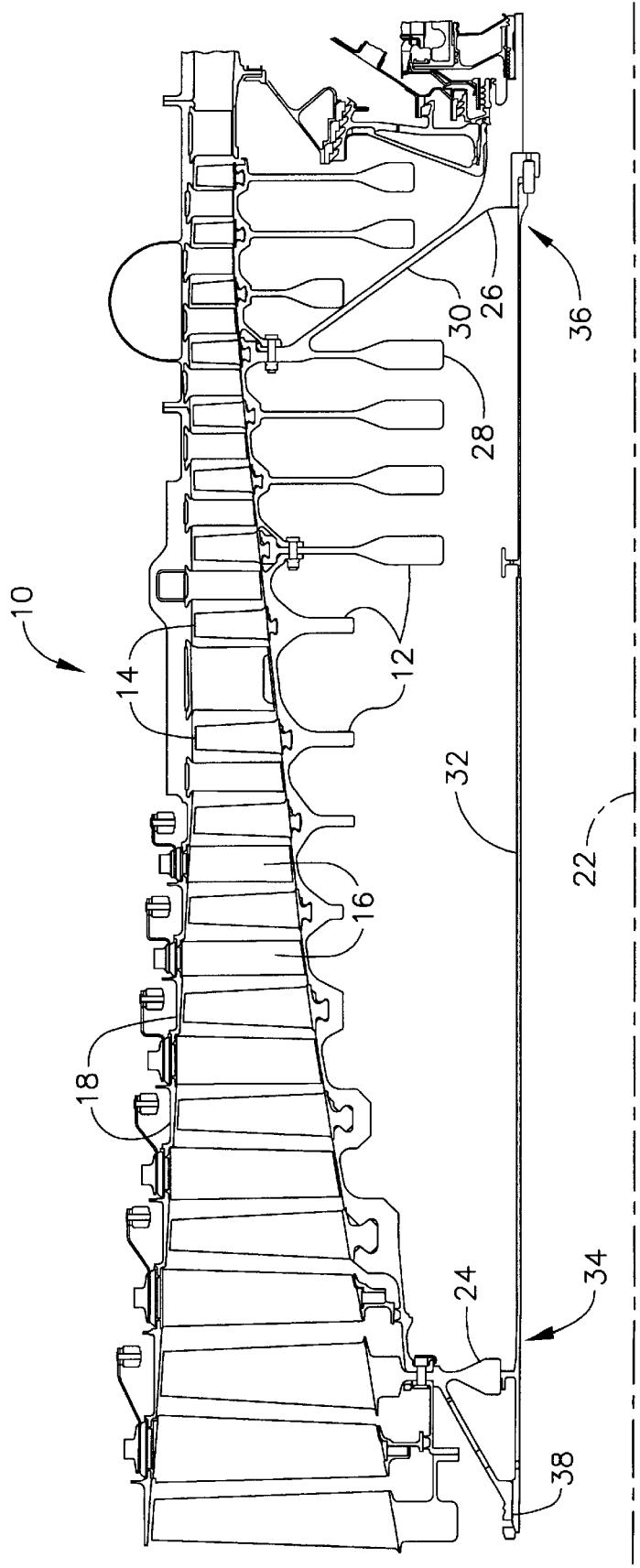
FIG. 1 is a longitudinal axial fragmentary sectional view of a gas turbine compressor rotor including an air duct assembly in accordance with one embodiment of the present invention.

FIG. 1 is a longitudinal axial fragmentary sectional view of a gas turbine compressor rotor 10 in accordance with one embodiment of the present invention. Rotor 10 includes successive stages of rotor disks 12 and a row of angularly spaced blades 14 coupled to each rotor disk 12. Annular rows of stator vanes 16 are coupled to a compressor casing 18, and project radially inwardly into the flow path between each consecutive stage of blades 14.

Rotor 10 rotates about compressor centerline 22 and includes a stage two disk 24 and a spool shaft 26 coupled to a stage thirteen disk 28 by a flange 30. An air duct 32, disposed about centerline 22, extends between stage two disk 24 and spool shaft 26. Air duct 32 is an elongate hollow cylindrical tube or duct that is configured to couple at a first end 34 to stage two disk 24 of compressor rotor 10, and at a second end 36 to spool shaft 26. First end 34 of air duct 32 is configured to have a cold clearance fit with an opening 38 of stage two disk 24.

Figure 2:
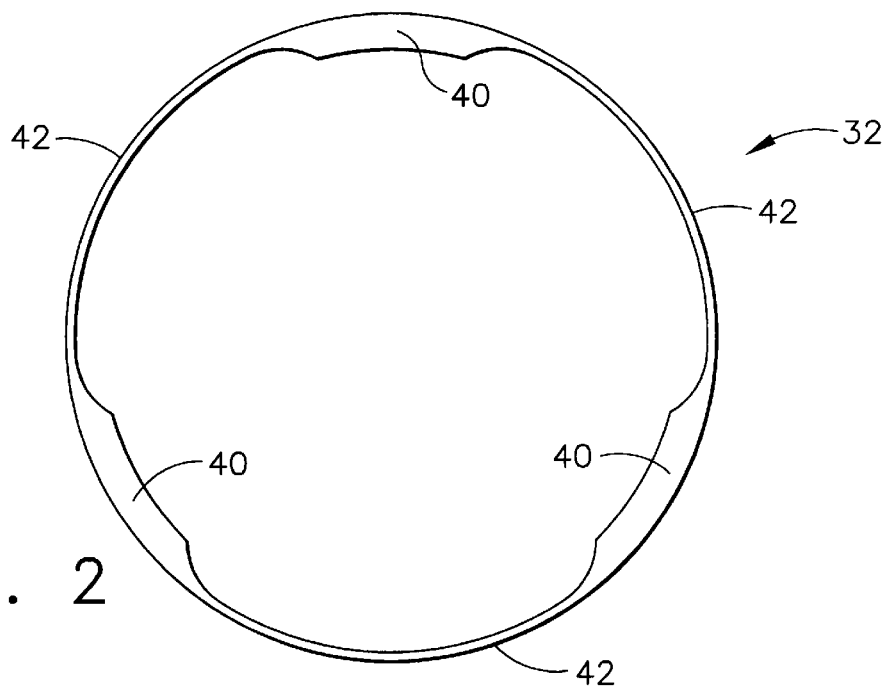
FIG. 2 is an end view of the air duct shown in FIG. 1.

Referring to FIG. 2, second end 36 of air duct 32 includes three lobes 40 equally spaced circumferentially about air duct 32, and depending radially inward from wall 42 of air duct 32. Air duct wall 42 is thinner than lobes 40 in the areas between lobes 40.

Figure 3:
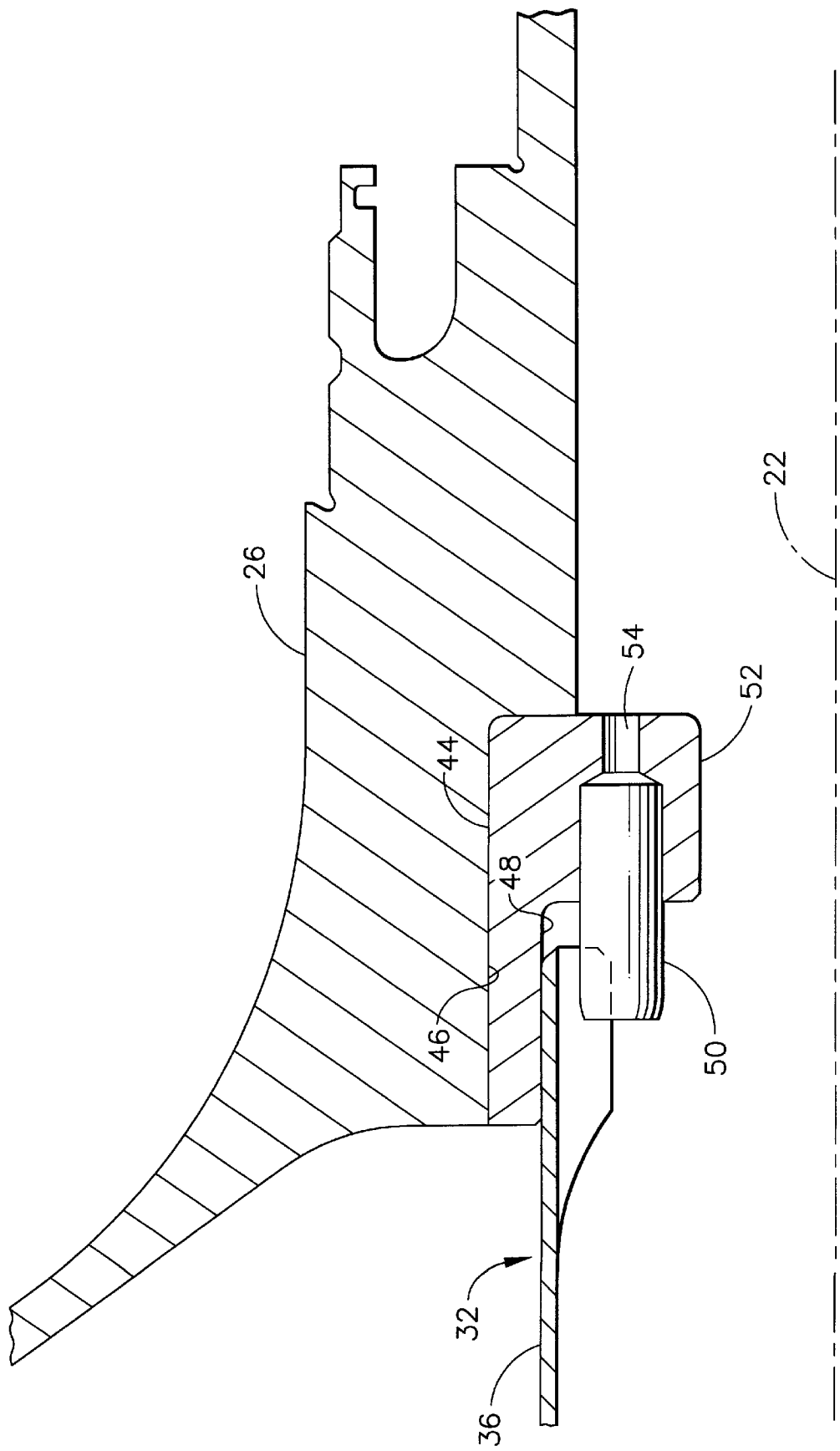
FIG. 3 is an enlarged longitudinal axial fragmentary sectional view of the air duct and the spool shaft shown in FIG. 1.

FIG. 3 is an enlarged longitudinal axial fragmentary sectional view of second end 36 of air duct 32 coupled to spool shaft 26. A spool shaft insert 44 is press fit into a bore 46 in spool shaft 26. Spool shaft insert 44 also couples to second end 36 of air duct 32. Air duct 32 is configured to have a radial clearance with a bore 48 of spool shaft insert 44 when the rotor 10 is stopped. This permits easy assembly and disassembly of compressor rotor 10.

In operation, that is when compressor rotor 10 starts turning about centerline 22, the centrifugal inertia forces on air duct 32 are larger at the location of lobes 40 compared to the thinner air duct wall 42 between lobes 40 due to the larger mass of lobes 40. Air duct 32 distorts elastically to a shape that has an outward radial deflection at lobes 40 and an inward radial deflection between lobes 40, a phenomena referred to as chording. Although the shape of air duct 32 is still curved, it approaches a three sided figure. The radial deflection at lobes 40 overcomes the radial clearance of air duct 32 to spool shaft insert 44 at a low rotor speed so that air duct 32 becomes centered in bore 48 of spool shaft insert 44. When the rotor stops rotating, the trilobe configured second end 36 of the air duct 32 returns to a round shape with radial clearance between spool shaft insert 44 and air duct 32. This allows for an easy disassembly of the components for maintenance.

Because first end 34 of air duct 32 is configured to have a clearance fit with opening 38 of stage two disk 24 there may be some movement off center of end 34 if air duct 32 is not balanced. Typically there is some inherent imbalance of air duct 32 that is easily remedied during a final assembly balance of rotor 10. However, if during operation, air duct 32 is allowed to rotate with respect to rotor 10 prior to lobes 40 deflecting outward to overcome the radial clearance between air duct 32 and spool shaft insert 44, the imbalance vector could move circumferentially. If the vector moves 180 degrees away from its initial assembly balance position, the imbalance vector would align with the balance correction weight vector causing an unacceptable double the initial imbalance.

Figure 4:
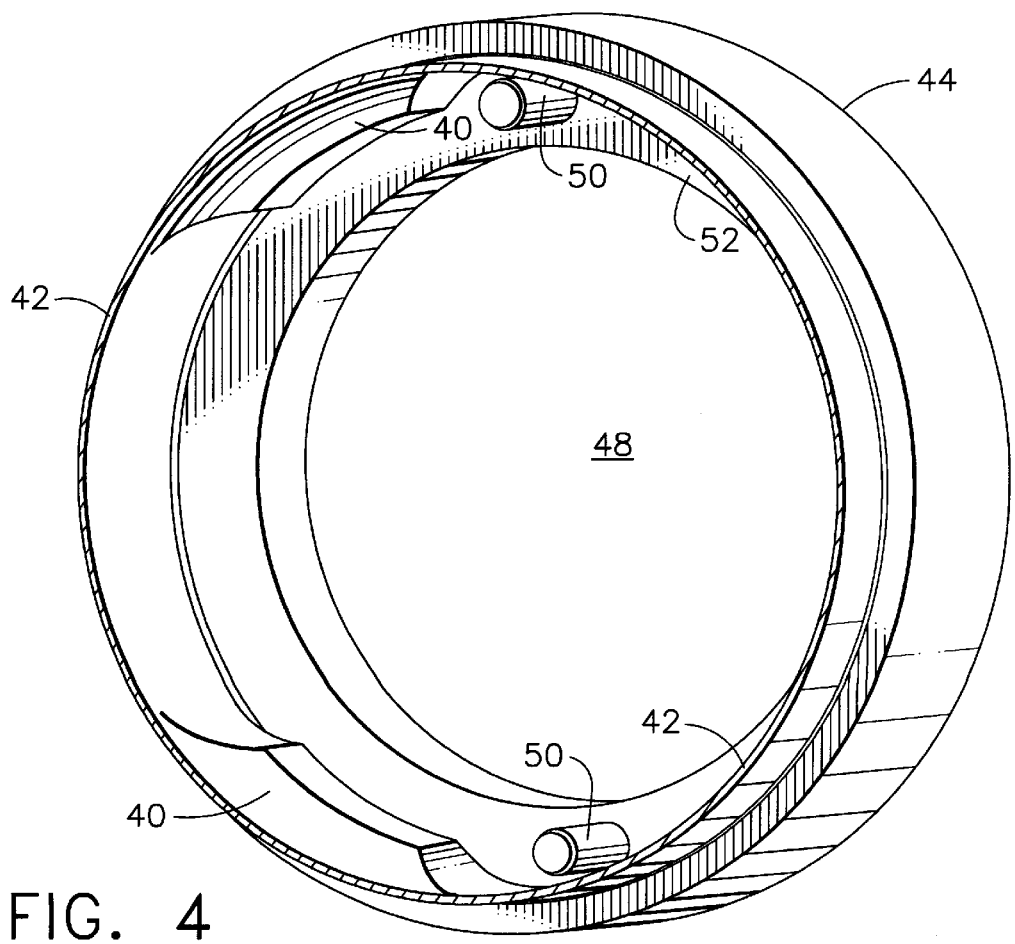
FIG. 4 is a cross sectional perspective view of the air duct and spool shaft shown in FIG. 3.

Referring to FIGS. 3 and 4, to prevent air duct 32 from rotating within bore 48 during engine startup, i.e., before lobes 40 have deflected outward far enough to overcome the radial clearance between air duct 32 and spool shaft insert 44, two anti-rotation pins 50 are coupled to and extend from spool shaft insert 44. Particularly, spool shaft insert 44 includes a lip 52 extending radially into bore 48. Pins 50 extend longitudinally from lip 52 and are configured to engage lobes 40. A small bore 54 extends through lip 52 from each pin 50 to provide access to each pin 50 for removal and to provide a path for air to escape as each pin 50 is coupled to lip 52.

Pins 50 are configured to engage lobes 40 of air duct 32 to restrict the rotational motion of duct 32 within bore 48. Pins 50 are positioned and configured so that there is a radial clearance between pins 50 and thinner air duct wall 42 between lobes 40. Pins 50 provide an interference between lobes 40 and pins 48. When pins 50 engage lobes 40, air duct 32 is prevented from rotating within bore 48.

In one embodiment, pins 50 are located 180 degrees apart in spool shaft insert 44. By locating pins 50 about 180 degrees apart and configuring air duct 32 to include three lobes 40, as shown in FIGS. 2 and 4, air duct 32 can only move through seven degrees of rotation within bore 48 before one of pins 50 engages a lobe 40. In another embodiment, lip 52 of spool shaft insert 44 includes integral projections configured to extend from lip 52 and to engage lobes 40.

The above-described rotor 10 provides for a tight fit between air duct 32 and spool shaft 26 during operation, and a radial clearance between shaft 26 and air duct 32 for easy disassembly when rotor 10 does not rotate. Additionally, rotor 10 may be configured so that air duct 32 will not rotate with respect to rotor 10 to prevent an out of balance condition.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, compressor rotors may have alternative configurations, and first end 34 of air duct 32 may be configured to couple to a front compressor shaft, and second end 36 of air duct 32 may be configured to couple to a rear compressor shaft. In addition, the air duct assembly may be used in connection with turbines other than gas turbines. Accordingly, the spirit and scope of the invention are to be limited only by the terms of the appended claims.

We claim:

1. An air duct assembly for a turbine compressor rotor, the rotor including a compressor spool shaft and at least one stage disk, said air duct assembly comprising:
   an elongate hollow cylindrical air duct having a first end and a second end, said first end configured to couple to a stage disk, said second end configured to couple to the spool shaft, said second end of said air duct comprising a plurality of lobes depending radially inward;
   a spool shaft insert configured to fit into an opening in the spool shaft; and
   a plurality of pins coupled to said spool shaft insert and configured to extend from said insert and to engage said lobes.

2. An air duct assembly in accordance with claim 1 wherein said second end of said air duct comprises three lobes.

3. An air duct assembly in accordance with claim 2 comprising two pins coupled to said spool shaft insert and configured to extend from said insert and to engage said lobes of said second end of said air duct.

4. An air duct assembly in accordance with claim 3 wherein said two pins are located 180 degrees apart.

5. An air duct assembly in accordance with claim 4 wherein the compressor comprises a first stage disk and a second stage disk, and said first end of said air duct is configured to couple to the second stage disk.

6. An air duct assembly in accordance with claim 1 wherein said spool shaft insert is configured to press fit into an opening in the spool shaft.

7. A compressor rotor comprising a compressor spool shaft, a first stage disk, a second stage disk, and an air duct assembly, said air duct assembly comprising:

an elongate hollow cylindrical air duct having a first end and a second end, said first end coupled to said stage disk, said second end coupled to said spool shaft, said second end of said air duct comprising a plurality of lobes depending radially inward; and a spool shaft insert fit into an opening in said spool shaft, said insert comprising a plurality of projections extending from said insert to engage said lobes of said second end of said air duct.

8. A compressor rotor in accordance with claim 7 wherein said second end of said air duct comprises three lobes.

9. A compressor rotor in accordance with claim 8 wherein said plurality of projections comprise a plurality of pins coupled to said insert and configured to extend from said insert to engage said lobes.

10. A compressor rotor in accordance with claim 9 wherein said air duct assembly comprises two pins coupled to said spool shaft insert and configured to extend from said insert to engage said lobes.

11. A compressor rotor in accordance with claim 10 wherein said two pins are located 180 degrees apart.

12. A compressor rotor in accordance with claim 7 wherein said spool shaft insert is configured to press fit into an opening in said spool shaft.

13. A compressor rotor in accordance with claim 7 wherein said first end of said air duct is coupled to said second stage disk.

14. An air duct assembly for a gas turbine compressor rotor in a gas turbine engine, comprising:

an elongate hollow cylindrical air duct having a first end and a second end, said first end configured to couple to the compressor rotor, said second end configured to couple to a compressor rear shaft, said second end of said air duct comprising a plurality of lobes depending radially inward; and a shaft insert configured to fit into an opening in the rear compressor shaft, said insert comprising a plurality of projections configured to extend from said insert and to engage said lobes of said second end of said air duct.

15. An air duct assembly in accordance with claim 14 wherein said first end of said air duct is configured to couple to a compressor stage disk.

16. An air duct assembly in accordance with claim 14 wherein said first end of said air duct is configured to couple to a compressor front shaft.

17. An air duct assembly in accordance with claim 14 wherein said compressor rear shaft comprises a spool shaft.

18. A air duct assembly in accordance with claim 14 wherein said plurality of projections comprise a plurality of pins coupled to said insert and configured to extend from said insert and to engage said lobes of said second end of said air duct.

19. An air duct assembly in accordance with claim 18 wherein said second end of said air duct comprises three lobes.

20. An air duct assembly in accordance with claim 19 comprising two pins coupled to said spool shaft insert and configured to extend from said insert and to engage said lobes, said two pins located 180 degrees apart.

* * * * *